Feb. 23, 1943.  O. H. PADDOCK ET AL  2,312,186
SHEET GLASS WASHING APPARATUS
Filed Feb. 27, 1941  2 Sheets-Sheet 1

Inventors
ORMOND H. PADDOCK.
CONRAD B. SCHAFER.

By Frank Fraser
Attorney

Feb. 23, 1943. O. H. PADDOCK ET AL 2,312,186
SHEET GLASS WASHING APPARATUS
Filed Feb. 27, 1941 2 Sheets-Sheet 2

Inventors.
ORMOND H. PADDOCK,
CONRAD B. SCHAFER.

By Frank Fraser
Attorney

Patented Feb. 23, 1943

2,312,186

UNITED STATES PATENT OFFICE 2,312,186

SHEET GLASS WASHING APPARATUS

Ormond H. Paddock, Rossford, and Conrad B. Schafer, Toledo, Ohio, assignors to Libbey-Owens-Ford Glass Company, Toledo, Ohio, a corporation of Ohio Application January 27, 1941, Serial No. 376,086

14 Claims. (Cl. 15—77)

The present invention relates broadly to improvements in sheet glass washing apparatus and more particularly to an apparatus for washing bent or curved sheets or plates of glass.

Although not limited to any specific use, this invention is of especial utility in the washing of glass sheets or plates whch are to be used in the manufacture of bent or curved laminated safety glass. Briefly stated, laminated safety glass comprises two or more sheets of glass having one or more sheets of a suitable plastic strengthening material interposed therebetween and bonded thereto to provide a composite structure. When manufacturing this type of glass, it is necessary that the glass sheets be thoroughly and carefully washed and cleaned before they can be satisfactorily united to the interposed sheet or sheets of plastic strengthening material. In the event the glass surfaces to be united are not perfectly clean and free from all dirt, dust and foreign matter, the bond between the laminations as well as the appearance of the finished composite sheet may be seriously affected.

The primary object of the invention is the provision of novel apparatus for effecting a thorough and efficient washing of the glass sheets or plates which go into the making of bent or curved laminated safety glass, whereby to facilitate proper adhesion between the component parts of the laminated sheet and reduce to a minimum the percentage of rejects caused by insufficient and unsatisfactory cleaning of the glass.

Another important object of the invention is the provision of apparatus of the above character wherein the washing of the bent or curved sheets or plates of glass may be accomplished rapidly and conveniently in a substantially continuous manner as the said sheets or plates are carried forwardly and while supported in a substantially horizontal position.

A further important object of the invention is the provision of washing apparatus of the above character of relatively cheap, simple construction and embodying means for horizontally supporting the bent or curved sheets or plates of glass and for carrying them forwardly during washing without placing any strain upon the glass whereby breakage thereof will be reduced to a minimum.

Other objects and advantages of the invention will become more apparent during the course of the following description, when taken in connection with the accompanying drawings.

In the drawings, wherein like numerals are employed to designate like parts throughout the same:

Figure 1:
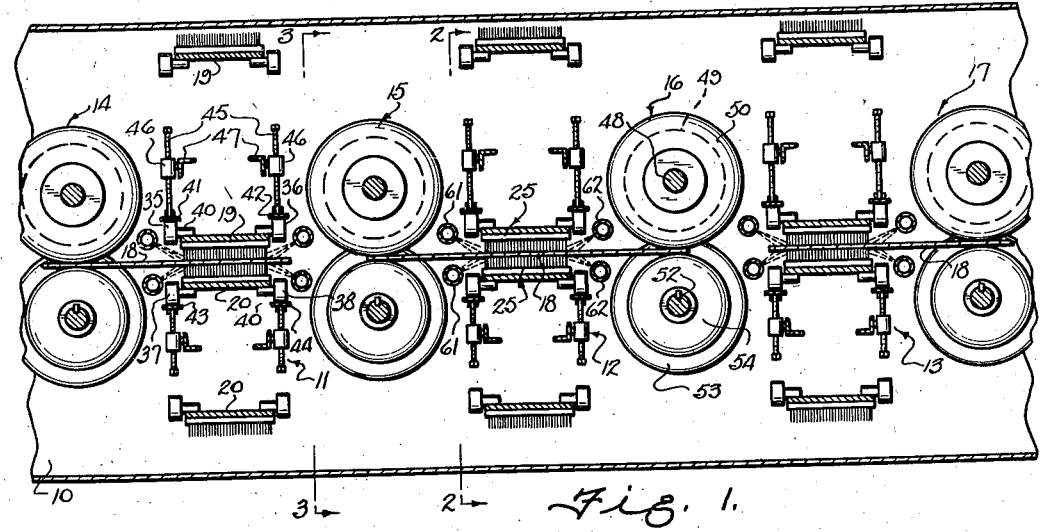
Fig. 1 is a vertical longitudinal sectional view through washing apparatus constructed in accordance with the present invention.

With reference now to the drawings, the numeral 10 designates a horizontally elongated tunnel-type housing of any suitable length depending upon the number of washing units and sets of conveyor rolls to be contained therein. As shown in Fig. 1, there are arranged within the housing 10 the three washing units designated 11, 12 and 13, while arranged alternately with said washing units are the sets of conveyor rolls 14, 15, 16 and 17 for advancing the glass sheets or plates 18 to be washed through the succeeding washing units 11, 12 and 13. The unit 11 preferably constitutes a detergent washing unit, the unit 12 a rinse unit, and the unit 13 a condensate unit. Inasmuch as all three washing units are of substantially the same construction, a detailed description of only one will be given.

Each washing unit 11, 12 and 13 comprises a pair of horizontal endless brush belts 19 and 20 arranged respectively one above the other and extending transversely of the direction of travel of the glass sheets therebetween. The upper brush belt 19 is trained at the opposite ends of its loop about pulleys 21 and 22, while the lower brush belt 20 is trained about pulleys 23 and 24. The curved or bent sheets or plates of glass 18 to be washed are adapted to be passed horizontally between the lower run or flight of the upper brush belt 19 and the upper run or flight of the lower brush belt 20, the adjacent glass engaging flights of said brush belts being curved to correspond to the curvature of said glass sheets or plates. In other words, when passed between the upper and lower brush belts, the axis of bend of the glass sheet or plate extends parallel to the direction of travel of the glass.

Figure 4:
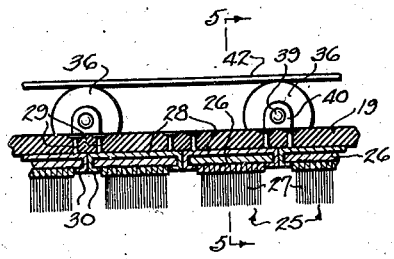
Fig. 4 is an enlarged detail sectional view showing the manner in which the washing brush units are removably supported.
Figure 5:
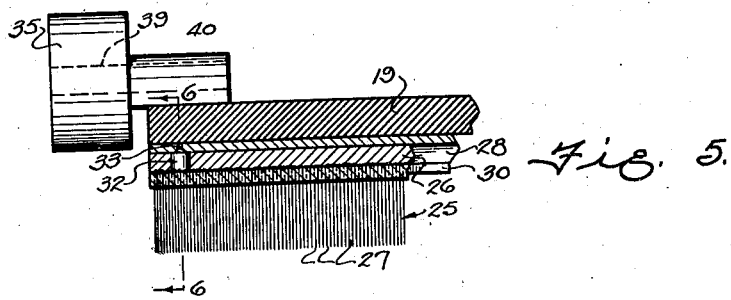
Fig. 5 is a detail sectional view taken substantially on line 5—5 of Fig. 4.
Figure 6:
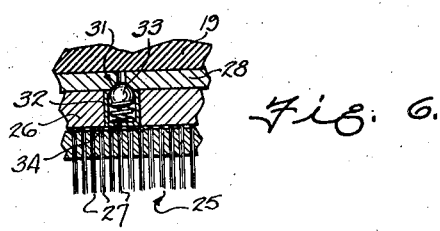
Fig. 6 is a detail sectional view taken substantially on line 6—6 of Fig. 5.

Each brush belt 19 and 20 carries a plurality of brush units 25 extending transversely thereof and removably secured in place so that they may be readily renewed when they become worn. Each brush unit 25 comprises a rectangular backing plate 26 carrying the customary washing bristles 27. As best shown in Figs. 4 and 5, there are carried by each endless brush belt 19 and 20 a plurality of undercut channel members 28 extending transversely of the belt and arranged side by side closely adjacent one another; each channel member being secured to the belt by staples or other suitable fastening means 29. One of the brush units 25 is associated with each channel member 28, the rectangular backing plate 26 of said brush unit being slidably received within said channel member. The channel member is also provided along the opposite sides thereof with inwardly directed lips 30 which serve to retain the brush unit in place.

For the purpose of removably securing each brush unit 25 within its respective channel member 28, the bottom of said channel member is provided with one or more countersunk openings 31, while the backing plate 26 of the brush unit is provided with one or more recesses within each of which is secured a housing 32 containing a ball bearing 33 and a spring 34 which serves to normally urge the ball bearing outwardly. When the brush unit 25 is slid into place in the channel member 28, the ball bearing 33 will be forced upwardly into the countersunk opening 31 when it comes into registry therewith by the spring 34 to secure the brush unit in place. With this arragement, however, the brush unit 25 can be readily removed for purposes of repair or replacement by simply pulling outwardly thereon, whereupon the ball bearing 33 will be moved inwardly against the action of the spring 34.

Carried by the upper endless brush belt 19 at the opposite sides thereof are a plurality of guide rollers 35 and 36, while similar guide rollers 37 and 38 are carried at the opposite sides of the lower brush belt 20. Each of the guide rollers 35, 36, 37 and 38 is carried at the outer end of a stub shaft 39 mounted within a block 40 suitably secured to the respective brush belt.

Figure 2:
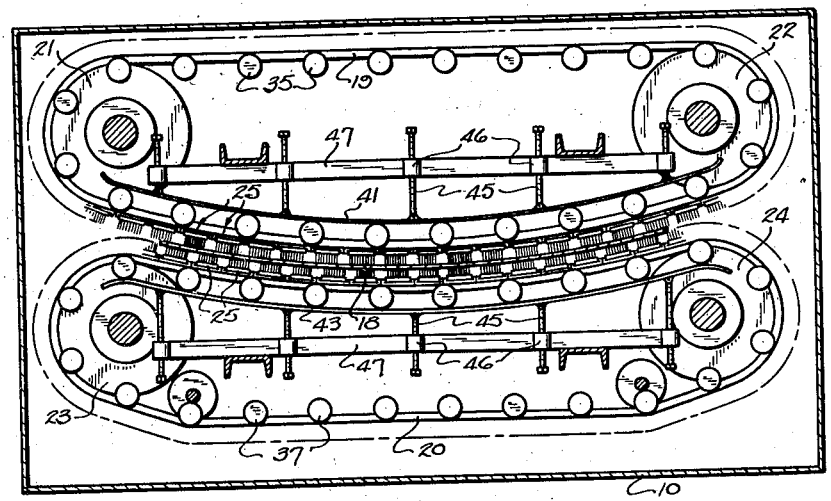
Fig. 2 is a vertical transverse sectional view taken substantially on line 2—2 of Fig. 1.

As pointed out above, the lower flight of the upper brush belt 19 and the upper flight of the lower brush belt 20 are correspondingly curved to conform to the curvature of the glass sheet or plate 18. Thus, in Fig. 2, the lower flight of the upper brush belt 19 is convex to correspond to the concave upper face of the glass sheet 18, while the upper flight of the lower brush belt 20 is concave to conform to the convex bottom face of the glass sheet. The lower flight of the upper brush belt is guided through a predetermined curved path by the curved guide strips 41 and 42, the bottom surfaces of which are engaged by the guide rollers 35 and 36 respectively, while the upper flight of the lower conveyor belt is guided by the curved guide strips 43 and 44, upon the upper surfaces of which the guide rollers 37 and 38 respectively ride. The guide strips 41, 42, 43 and 44 are of flexible metal so that they can be shaped to correspond to glass sheets or plates of different curvatures, and to this end each of said guide strips may be carried by a plurality of vertical screws 45 threaded through bearings 46 secured to a stationary horizontal angle iron 47. By proper adjustment of the vertical screws 45, the curvature of the flexible metal guide strips can be varied as desired.

Each set of conveyor rolls 14, 15, 16 and 17 comprises an upper horizontal shaft 48 on which are mounted the three spaced rolls 49, 50 and 51, and a lower shaft 52 parallel with shaft 48 and carrying rolls 53, 54 and 55. The shafts 48 and 52 are journaled at their opposite ends in bearing standards 56 and 57 arranged within the housing 10. One of the shafts, and as here shown shaft 52, is driven by a chain and sprocket drive or the like 58 and the upper shaft 48 driven from the lower shaft through the intermeshing gears 59 and 60.

Figure 3:
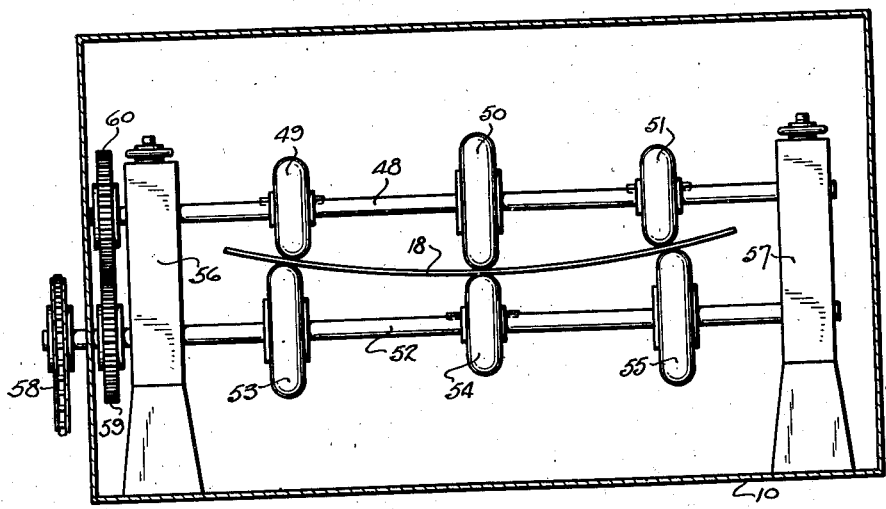
Fig. 3 is a vertical transverse sectional view taken substantially on line 3—3 of Fig. 1 and showing one set of conveyor rolls in elevation.

It will be noted in Fig. 3 that the upper conveyor rolls 49, 50 and 51 and lower conveyor rolls 53, 54 and 55 are of relative sizes according to the curvature of the glass sheet 18 to be conveyed therebetween. Thus, with the shape of sheet illustrated, the lower center roll 54 is relatively smaller than the two end rolls 53 and 55, while the upper center roll 50 is relatively larger than the two end rolls 49 and 51. It is also preferred that the upper end rolls 49 and 51 be positively driven by being suitably keyed to the shaft 48, while the center roll 50 is freely rotatable on said shaft. On the other hand, the center lower roll 54 is preferably keyed to shaft 52, while the two end rolls 53 and 55 are rotatable freely thereon. In other words, all of the rolls of one diameter are positively driven, while the remaining rolls are idler rolls, and this arrangement is provided to compensate for the differential in the speed of rotation between the rolls of different diameters.

In the operation of the apparatus, the glass sheets or plates 18 to be washed are carried successively through the washing units 11, 12 and 13 by means of the sets of conveyor rolls 14, 15, 16 and 17, with the axis of bend of the sheet or plate extending parallel with the direction of travel thereof. It is also preferred that the three washing units 11, 12 and 13 subject the glass sheets or plates to different washing operations, although the invention is not restricted thereto. For instance, the first unit 11 preferably constitutes a detergent washing unit, the second unit 12 a brushing and rinse unit, and the third unit 13 a condensate unit. In passing between the upper and lower endless brush belts 19 and 20 of the first unit 11, the glass sheets are adapted to be scrubbed by the action of the brush units, and a suitable detergent solution is also directed upon opposite surfaces of the sheet from spray pipes or the like 61 and 62 arranged at opposite sides of the unit. One form of detergent which may be used comprises a solution of water, soap and a water softener (Calgon), to which may or may not be added a relatively small amount of soda ash, as preferred. In passing through the second section 12, the glass sheet is subjected to a brushing and rinsing operation with plain city water sprayed upon opposite surfaces of said sheet; while in the third or condensate section 13, the glass sheet is subjected to a secondary rinse by means of pure (distilled) water applied to the opposite surfaces of the sheet.

While there has been illustrated in Fig. 1 a housing containing three washing units, it will be appreciated that the invention is not limited to the use of any particular number of washing units or to subjecting the sheets to any particular number of washing operations. Also, the apparatus herein disclosed is not restricted to the washing of glass sheets or plates, but may also be employed in the washing of other sheet material.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for washing bent or curved sheets or plates of glass and the like, a pair of horizontal endless brush belts arranged one above the other adapted to receive the sheet therebetween and extending transversely of the direction of travel of said sheet, and means for passing the sheet between said brush belts, with the axis of bend of said sheet extending parallel to the direction of travel of the said sheet, the inner adjacent flights of said brush belts being curved to correspond to the curvature of said sheet.

2. In apparatus for washing bent or curved sheets or plates of glass and the like, a pair of horizontal endless brush belts arranged one above the other adapted to receive the sheet therebetween and extending transversely of the direction of travel of said sheet, means for passing the sheet between said brush belts, with the axis of bend of said sheet extending parallel to the direction of travel of the said sheet, the inner adjacent flights of said brush belts being curved to correspond to the curvature of said sheet, and means for varying the curvature of the inner adjacent flights of said brush belts depending upon the curvature of the sheet being washed.

3. In apparatus for washing bent or curved sheets or plates of glass and the like, a pair of horizontal endless brush belts arranged one above the other adapted to receive the sheet therebetween and extending transversely of the direction of travel of said sheet, means for passing the sheet between said brush belts, with the axis of bend of said sheet extending parallel to the direction of travel of the said sheet, means for guiding the inner adjacent flights of said brush belts through predetermined curved paths corresponding to the curvature of said sheet, and means for adjusting said guide means to vary the curvature of the inner adjacent flights of said brush belts depending upon the curvature of the sheet being washed.

4. In apparatus for washing bent or curved sheets or plates of glass and the like, a pair of horizontal endless brush belts arranged one above the other adapted to receive the sheet therebetween and extending transversely of the direction of travel of said sheet, means for passing the sheet between said brush belts, with the axis of bend of said sheet extending parallel to the direction of travel of the said sheet, flexible guide strips for guiding the inner adjacent flights of said brush belts through predetermined curved paths corresponding to the curvature of said sheet, and means for varying the curvature of said guide strips to vary the curvature of the inner adjacent flights of said brush belts depending upon the curvature of the sheet being washed.

5. In apparatus for washing bent or curved sheets or plates of glass and the like, a pair of horizontal endless brush belts arranged one above the other adapted to receive the sheet therebetween and extending transversely of the direction of travel of said sheet, a plurality of undercut channel members carried by each brush belt and extending transversely thereof, a brush unit removably carried by each undercut channel member, and means for passing the sheet between the brush units carried by said brush belts, with the axis of bend of said sheet extending parallel to the direction of travel of the said sheet, the inner adjacent flights of said brush belts being curved to correspond to the curvature of said sheet.

6. In apparatus for washing bent or curved sheets or plates of glass and the like, a pair of horizontal endless brush belts arranged one above the other adapted to receive the sheet therebetween and extending transversely of the direction of travel of said sheet, a plurality of undercut channel members carried by each brush belt and extending transversely thereof, a brush unit removably carried by each channel member, means for removably securing each brush unit within its respective channel member, means for passing the sheet between the brush units carried by said brush belts, with the axis of bend of said sheet extending parallel to the direction of travel of the said sheet, the inner adjacent flights of said brush belts being curved to correspond to the curvature of said sheet, and means for varying the curvature of the inner adjacent flights of said brush belts depending upon the curvature of the sheet being washed.

7. In apparatus for washing bent or curved sheets or plates of glass and the like, a pair of horizontal endless brush belts arranged one above the other adapted to receive the sheet therebetween and extending transversely of the direction of travel of said sheet, brush units removably carried by each brush belt, means for passing the sheet between the brush units carried by said brush belts, with the axis of bend of said sheet extending parallel to the direction of travel of the said sheet, means for guiding the inner adjacent flights of said brush belts through predetermined curved paths corresponding to the curvature of said sheet, and means for adjusting said guide means to vary the curvature of the inner adjacent flights of said brush belts depending upon the curvature of the sheet being washed.

8. In apparatus for washing bent or curved sheets or plates of glass and the like, a pair of horizontal endless brush belts arranged one above the other adapted to receive the sheet therebetween and extending transversely of the direction of travel of said sheet, a plurality of undercut channel members carried by each brush belt and extending transversely thereof, a brush unit slidably received within each channel member, means for removably securing each brush unit within its respective channel member, means for passing the sheet between the brush units carried by said brush belts, with the axis of bend of said sheet extending parallel to the direction of travel of the said sheet, flexible guide strips for guiding the inner adjacent flights of said brush belts through predetermined curved paths corresponding to the curvature of said sheet, and means for varying the curvature of said guide strips to vary the curvature of the inner adjacent flights of said brush belts depending upon the curvature of the sheet being washed.

9. In apparatus for washing bent or curved sheets or plates of glass and the like, a pair of horizontal endless brush belts arranged one above the other adapted to receive the sheet therebetween and extending transversely of the direction of travel of said sheet, means for passing the sheet between said brush belts, with the axis of bend of said sheet extending parallel to the direction of travel of the said sheet, guide rollers carried at the opposite sides of each brush belt, and flexible guide strips engageable by said guide rollers for guiding the inner adjacent flights of said brush belts through predetermined curved paths corresponding to the curvature of said sheet.

10. In apparatus for washing bent or curved sheets or plates of glass and the like, a pair of horizontal endless brush belts arranged one above the other adapted to receive the sheet therebetween and extending transversely of the direction of travel of said sheet, brush units removably carried by each brush belt, means for passing the sheet between the brush units carried by said brush belts, with the axis of bend of said sheet extending parallel to the direction of travel of the said sheet, guide rollers carried at the opposite sides of each brush belt, flexible guide strips engageable by said guide rollers for guiding the inner adjacent flights of said brush belts through predetermined curved paths corresponding to the curvature of said sheet, a stationary support for each flexible guide strip, and adjusting screws carried by the guide strip and threaded through said support for varying the curvature of the said guide strip.

11. In apparatus for washing bent or curved sheets or plates of glass and the like, a pair of horizontal endless brush belts arranged one above the other adapted to receive the sheet therebetween and extending transversely of the direction of travel of the said sheet, and means for passing the sheet between said brush belts with the axis of bend of said sheet extending parallel to the direction of travel of the said sheet including horizontal shafts mounted above and beneath the path of travel of the sheet and a plurality of conveyor rolls carried upon each shaft, said rolls having varying diameters to correspond to the curvature of said sheet, the inner adjacent flights of said brush belts also being curved to correspond to the curvature of the said sheet.

12. In apparatus for washing bent or curved sheets or plates of glass and the like, a pair of horizontal endless brush belts arranged one above the other adapted to receive the sheet therebetween and extending transversely of the direction of travel of the said sheet, and means for passing the sheet between said brush belts with the axis of bend of said sheet extending parallel to the direction of travel of the said sheet including horizontal shafts mounted above and beneath the path of travel of the sheet and a plurality of conveyor rolls carried upon each shaft, said rolls having varying diameters to correspond to the curvature of said sheet, with the rolls having one diameter being driven and the remaining being idler rolls, the inner adjacent flights of said brush belts being also curved to correspond to the curvature of the said sheet.

13. In apparatus for washing bent or curved sheets or plates of glass and the like, a pair of horizontal endless brush belts arranged one above the other adapted to receive the sheet therebetween and extending transversely of the direction of travel of said sheet, a plurality of undercut channel members carried by each brush belt and extending transversely thereof, a brush unit slidably received within each channel member, means carried by each brush unit and engaging the respective channel member to removably secure said brush unit therein, and means for passing the sheet between the brush units carried by said brush belts with the axis of bend of said sheet extending parallel to the direction of travel of the said sheet including horizontal shafts mounted above and beneath the path of travel of the sheet and a plurality of conveyor rolls carried upon each shaft, said rolls having varying diameters to correspond to the curvature of said sheet, the inner adjacent flights of said brush belts being also curved to correspond to the curvature of the said sheet.

14. In apparatus for washing bent or curved sheets or plates of glass and the like, a pair of horizontal endless brush belts arranged one above the other adapted to receive the sheet therebetween and extending transversely of the direction of travel of said sheet, a plurality of undercut channel members carried by each brush belt and extending transversely thereof, a brush unit slidably received within each channel member, means carried by each brush unit and engaging the respective channel member to removably secure said brush unit therein, and means for passing the sheet between the brush units carried by said brush belts with the axis of bend of said sheet extending parallel to the direction of travel of the said sheet including horizontal shafts mounted above and beneath the path of travel of the sheet and a plurality of conveyor rolls carried upon each shaft, said rolls having varying diameters to correspond to the curvature of the sheet and the rolls of one diameter being driven while the remaining rolls are idler rolls, the inner adjacent flights of said brush belts being also curved to correspond to the curvature of the said sheet.

ORMOND H. PADDOCK.
CONRAD B. SCHAFER.